United States Patent
Lord

(10) Patent No.: US 10,830,129 B2
(45) Date of Patent: Nov. 10, 2020

(54) TRANSVERSE-MOUNTED POWER TURBINE DRIVE SYSTEM

(71) Applicant: United Technologies Corporation, Farmington, CT (US)

(72) Inventor: Wesley K. Lord, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 941 days.

(21) Appl. No.: 15/104,114

(22) PCT Filed: Dec. 12, 2014

(86) PCT No.: PCT/US2014/070061
§ 371 (c)(1),
(2) Date: Jun. 13, 2016

(87) PCT Pub. No.: WO2015/134081
PCT Pub. Date: Sep. 11, 2015

(65) Prior Publication Data
US 2016/0290227 A1 Oct. 6, 2016

Related U.S. Application Data

(60) Provisional application No. 61/915,915, filed on Dec. 13, 2013.

(51) Int. Cl.
*F02C 3/04* (2006.01)
*F02C 7/36* (2006.01)
(Continued)

(52) U.S. Cl.
CPC .............. *F02C 3/04* (2013.01); *B64D 27/14* (2013.01); *B64D 29/04* (2013.01); *F02C 3/10* (2013.01);
(Continued)

(58) Field of Classification Search
CPC .... F02C 3/04; F02C 3/10; F02C 3/107; F02C 7/32; F02C 7/36; B64D 27/14;
(Continued)

(56) References Cited

U.S. PATENT DOCUMENTS 4,270,408 A * 6/1981 Wagner ............... F02C 6/02
74/402
4,286,430 A * 9/1981 Smith ............... F02C 3/10
60/226.1
(Continued)

FOREIGN PATENT DOCUMENTS

EP 2202152 A2 6/2010
EP 2905429 A1 8/2015
(Continued)

OTHER PUBLICATIONS

Foreign Priority Document GB 1303860.9, relied upon for foreign priority claim in U.S. Appl. No. 14/173,394 for foreign priority, filed on Mar. 5, 2013 (Year: 2013).*
(Continued)

*Primary Examiner* — Jason H Duger
(74) *Attorney, Agent, or Firm* — Cantor Colburn LLP

(57) ABSTRACT

The present disclosure relates generally to an aircraft with counter-rotating pusher props powered by a gas turbine engine having a power turbine disposed substantially perpendicular to the compressor, combustor and turbine gas generator power core axis, as well as to the aircraft longitudinal axis.

19 Claims, 4 Drawing Sheets

(51) Int. Cl.
- *F02K 3/072* (2006.01)
- *B64D 27/14* (2006.01)
- *B64D 29/04* (2006.01)
- *F02C 3/107* (2006.01)
- *F02C 3/10* (2006.01)
- *F02K 3/02* (2006.01)
- *B64D 27/00* (2006.01)

(52) U.S. Cl.
CPC .............. *F02C 3/107* (2013.01); *F02C 7/36* (2013.01); *F02K 3/025* (2013.01); *F02K 3/072* (2013.01); *B64D 2027/005* (2013.01); *F05D 2220/32* (2013.01); *F05D 2220/325* (2013.01); *F05D 2250/313* (2013.01); *Y02T 50/66* (2013.01); *Y02T 50/671* (2013.01)

(58) Field of Classification Search
CPC ... B64D 29/04; B64D 2027/005; F02K 3/025; F02K 3/072; F05D 2220/32; F05D 2220/325; F05D 2250/313
See application file for complete search history.

(56) References Cited

U.S. PATENT DOCUMENTS

| | | | | |
|---|---|---|---|---|
| 4,936,748 | A * | 6/1990 | Adamson | F02C 6/206 416/123 |
| 5,209,428 | A | 5/1993 | Bevilaqua et al. | |
| 8,708,274 | B2 | 4/2014 | Lord | |
| 2008/0098719 | A1 | 5/2008 | Addis | |
| 2010/0329844 | A1 | 12/2010 | Bradbrook | |
| 2012/0128487 | A1 * | 5/2012 | Eames | F01D 15/12 416/1 |
| 2013/0000273 | A1 | 1/2013 | Roberge et al. | |
| 2013/0062463 | A1 | 3/2013 | Lord | |
| 2013/0174533 | A1 * | 7/2013 | Ribarov | B64C 11/48 60/226.1 |
| 2013/0205747 | A1 * | 8/2013 | Suciu | F02K 3/06 60/39.15 |
| 2014/0252159 | A1 * | 9/2014 | Stretton | B64D 27/14 244/54 |

FOREIGN PATENT DOCUMENTS

| | | |
|---|---|---|
| GB | 574347 A | 1/1946 |
| GB | 594207 B | 11/1947 |
| GB | 2225297 A | 5/1999 |
| GB | 2485901 A | 5/2012 |
| WO | 9306007 A1 | 4/1993 |

OTHER PUBLICATIONS

EP Office Action for Application No. 14 885 004.3-1010; dated Nov. 30, 2018.
European Search Report for Application No. EP 14 88 5004.
NASA-CR-180869; Full Scale Technology Demonstration of a Modern Counterrotating Unducted Fan Engine Concept; General Electric Aircraft Division; Design Report; Dec. 1987; 350 pages.
Notification of Transmittal of the International Search Report of the International Searching Authority, or the Declaration; PCT/US2014/070061; dated Sep. 16, 2015. 3 pages.
Notification of Transmittal of the Written Opinion of the International Searching Authority, or the Declaration; PCT/US2014/070061; dated Sep. 16, 2015. 10 pages.

* cited by examiner

TRANSVERSE-MOUNTED POWER TURBINE DRIVE SYSTEM

RELATED APPLICATIONS

This application is a National Phase Application of Patent Application PCT/2014/070061 filed on Dec. 12, 2014, which is incorporated herein by reference and claims the benefit of and incorporates by reference herein the disclosure of U.S. Ser. No. 61/915,915, filed Dec. 13, 2013.

TECHNICAL FIELD OF THE DISCLOSURE

The present disclosure is generally related to gas turbine engines and, more specifically, to a transverse-mounted power turbine drive system.

BACKGROUND OF THE DISCLOSURE

There is current interest in aircraft configurations with counter-rotating pusher props (propellers) installed on the aft aircraft fuselage.

Accordingly, improvements in the design of aircraft configurations with counter-rotating pusher props installed on the aft aircraft fuselage are still desired.

SUMMARY OF THE DISCLOSURE

In one embodiment, an assembly for use in a gas turbine engine is disclosed, the assembly comprising: a gas generator comprising a compressor, a combustor and a turbine mounted along a power core axis; a shaft operably coupled to the turbine and extending along a shaft axis transverse to the power core axis; and a propulsion fan operatively coupled to the shaft.

In another embodiment, a gas turbine engine is disclosed, comprising: a gas generator comprising a compressor, a combustor and a turbine mounted along a power core axis; a shaft operably coupled to the turbine and extending along a shaft axis transverse to the power core axis; a propulsion fan; and a gearbox operably coupling the propulsion fan to the shaft; wherein the propulsion fan rotates about a fan axis transverse to the shaft axis.

In another embodiment, an aircraft is disclosed, comprising: a fuselage having a nose section and a tail section separated along a fuselage longitudinal axis; at least one gas turbine engine comprising: a gas generator comprising a compressor, a combustor and a turbine mounted about a power core axis; and a power turbine aerodynamically coupled to the gas generator, the power turbine mounted in the fuselage about a power turbine axis that is substantially perpendicular to the power core axis; and at least one propulsion fan mounted on the fuselage, the propulsion fan being operatively coupled to the power turbine.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
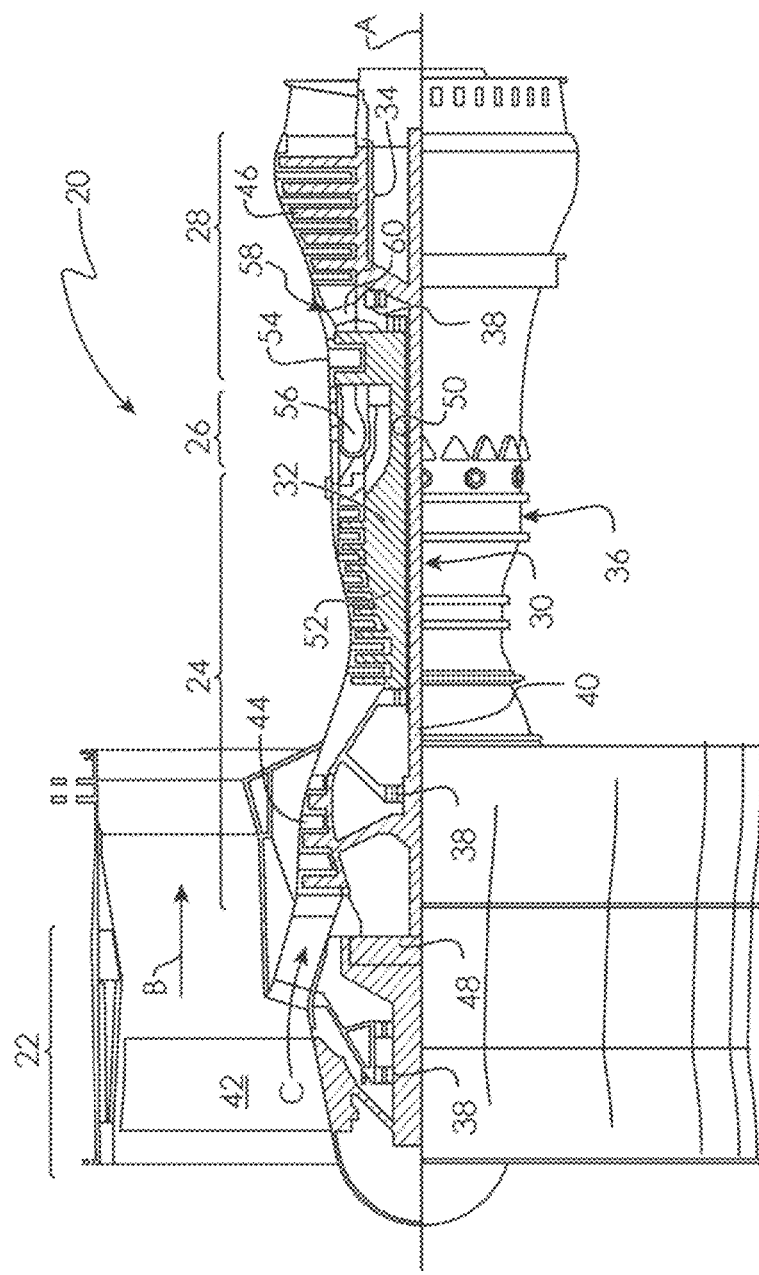
FIG. 1 is a schematic partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
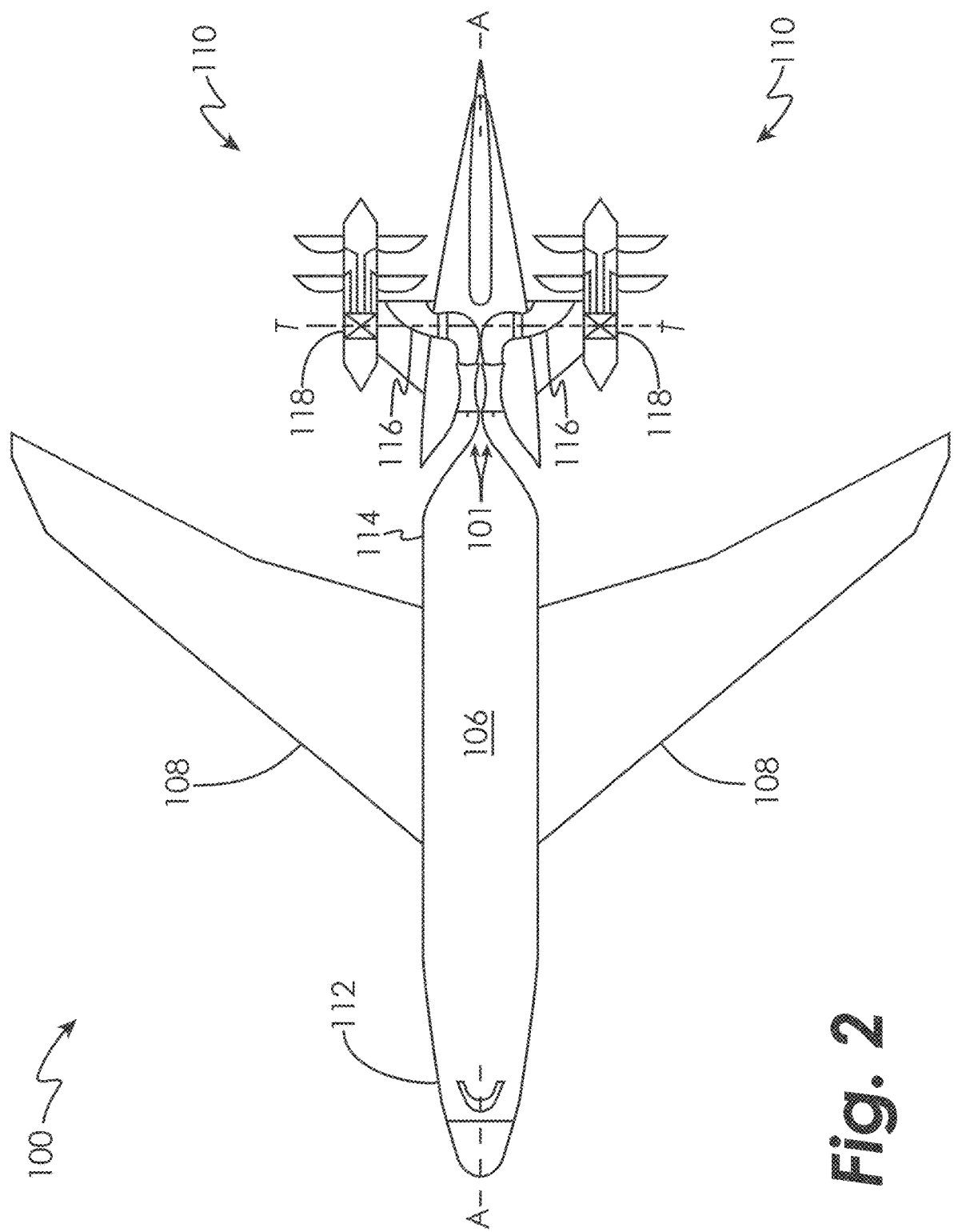
FIG. 2 is a schematic view of an aircraft with counter-rotating pusher props installed on the aft aircraft fuselage in an embodiment.

FIG. 2 is a schematic diagram of aircraft 100. Aircraft 100 includes two gas turbine engines 101, fuselage 106 and wings 108. Gas turbine engines 101 are mounted in an aft portion of the fuselage 106, and operatively coupled to two propulsion fans (or fan assemblies) 110, respectively. In the particular configuration of FIG. 2, aircraft 100 is of fixed-wing design. Fuselage 106 extends from nose section 112 to tail section 114 along longitudinal axis A, with wings 108 fixed to fuselage 106 between nose 112 and tail 114.

As explained in greater detail hereinbelow, gas turbine engines 101 each provide a gas generator 102 driving a power turbine 128 (see FIG. 3), with the power turbine 128 rotationally mounted about power turbine axis T in tail section 114 of fuselage 106. Power turbine axis T is oriented in a transverse or substantially perpendicular direction with respect to longitudinal axis A of fuselage 106.

Propulsion fan assemblies 110 are operatively coupled to gas turbine engines 101 via shafts 116 and right-angle gearboxes 118. Shafts 116 extend along and rotate about power turbine axis T. Propulsion fan assemblies 110 rotate about respective axes transverse or perpendicular to power turbine axis T, longitudinally or substantially parallel with respect one another, and longitudinally or substantially parallel with respect to axis A of fuselage 106.

Figure 3:
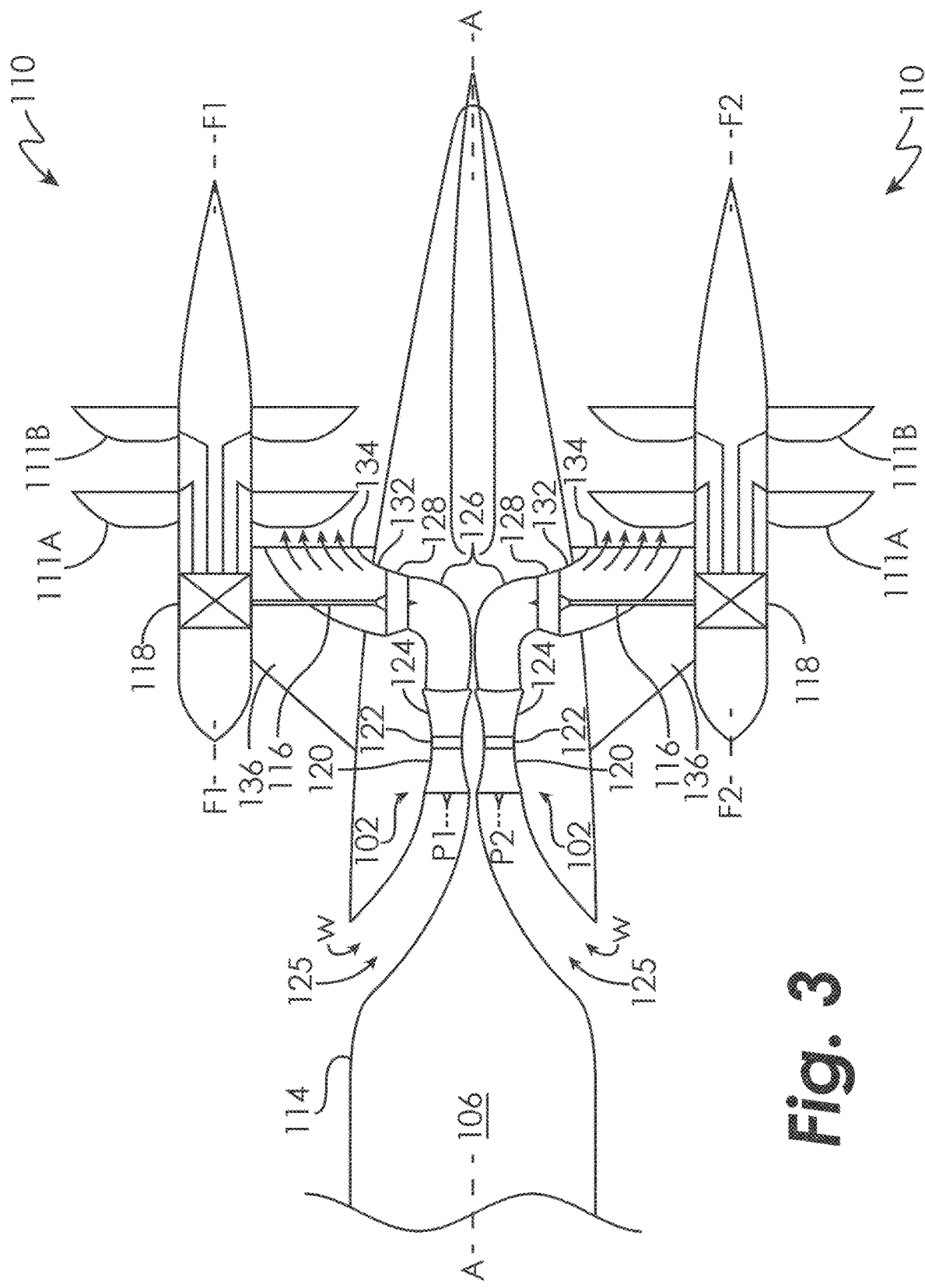
FIG. 3 is a schematic view of an aircraft tail section with counter-rotating pusher props installed on the aft aircraft fuselage in an embodiment.

FIG. 3 is a schematic top view of aircraft 100, showing tail section 114 of fuselage 106 with twin propulsion fan assemblies 110. Propulsion fan assemblies 110 rotate about fan axes F1 and F2, transverse to power turbine axis T and longitudinal or substantially parallel with respect to fuselage axis A. In the particular configuration of FIG. 3, twin propulsion fan assemblies 110 each include two unducted, counter-rotating fan stages (or rotors) 111A and 111B, and are mounted to aerodynamic struts 136 on the opposite sides of fuselage 106. Fan stages 111A and 111B counter-rotate rotate about fan axes F1 and F2 on the left (port) and right (starboard) sides of tail section 114, respectively.

In one configuration, right-angle gear boxes 118 include bevel gears to transmit power to two output gears, simultaneously driving both counter-rotating fan stages 111A and 111B, so that the load is better balanced and distributed over more gear teeth. In addition, counter-rotating fan stages 111A and 111B can be configured to reduce or eliminate swirl in the exit flow, increasing propulsive efficiency. Alternatively, propulsion fans 110 include only one fan stage 111A, without counter-rotating stage 111B.

Each gas generator 102 forms a power core including compressor section (or compressor) 120, combustor section (burner or combustor) 122 and turbine section (or turbine) 124. Inlets 125 provide inlet air to each gas generator 102. Working fluid flow (or airflow) W enters compressor 120 via inlet 125. Compressed air is mixed with fuel in combustor 122 to generate hot combustion gas, which drives turbine 124 and exits into transition duct 126. The gas generator 102 may comprise a single spool engine including a high pressure compressor, a combustor, and a high pressure turbine in an embodiment. In another embodiment, the gas generator 102 may comprise a two-spool engine with concentric shafts. Gas generators 102 have power core axes P1 and P2. P1 and P2 are not substantially parallel with power turbine axis T. The power core axes P1 and P1 are substantially parallel to the aircraft longitudinal axis A and substantially perpendicular to the power turbine axis T. However, the power core axes P1 and P2 may not be exactly parallel to each other and may be slightly inclined to the aircraft longitudinal axis A in order to accommodate diameter differences between the compressor and turbine sections and/or to optimize the installation within the tail section 114.

Core gas exiting the turbine 124 of gas generator 102 passes through a transition duct 126 that turns the core gas flow so that the core gas flow is substantially parallel to the power turbine axis T. In some embodiments, one or more turning vanes (not shown) may be provided within the transition duct 126 to assist in turning the core gas flow within the transition duct 126. A power turbine 128 receives the core gas flow, providing power to rotate shaft 116 coupled to right-angle gearbox 118. Core gas flow exiting the power turbine 128 enters an exhaust duct 132 and exits the aircraft 100 at the trailing edge 134 of the strut 136.

Gearboxes 118 include a right-angle or transverse gearing mechanism, analogous to a STOVL (short takeoff and vertical landing) lift fan gearing, driving counter-rotating fan stages 111A and 111B with substantially parallel fan axes F1 and F2 oriented transversely or substantially perpendicular to turbine axis T, and substantially parallel or longitudinally with respect to fuselage 106.

Consistent with these definitions, "substantially parallel" include angles of up to five degrees (5°). For example, fan axes F1 and F2 may be substantially parallel within one or two degrees (1-2°), or fan axes F1 and F2 may be substantially parallel yet slightly convergent or divergent (e.g., with a cant angle of up to 5°) for improved thrust and aerodynamic or structural performance. Similarly, fan axes F1 and F2 may be substantially parallel to longitudinal axis A of fuselage 106 within 1-2°, or fan axes F1 and F2 may be substantially parallel to longitudinal axis A but angled by up to 5° in order to improve airflow, efficiency, thrust output and operational stability over a range of different angles of attack.

Similarly, "substantially perpendicular" includes angles of eighty to ninety degrees (80-90°). Thus, power turbine axis T may be oriented transversely and substantially perpendicular to longitudinal axis A, but with an upstream or downstream angle of up to 10° to improve airflow. Alternatively, a "transverse" orientation includes angles of sixty to ninety degrees (60-90°); that is, with power turbine axis T oriented at an upstream or downstream angle of up to 30° with respect to longitudinal axis A. Conversely, a "longitudinal" orientation for propulsion fans 111 includes angles of up to thirty degrees (0-30°) between fan axes F1, F2 and longitudinal axis A of fuselage 106.

In some embodiments, fan assemblies 110 have a two-stage, counter-rotating, unducted or open rotor propfan configuration. As opposed to existing high-bypass turbofan designs, the non-axial power core design disclosed herein forms a relatively small gas generator 102 and power turbine 128 combination, with less weight and greater fuel efficiency. No propulsor drive shaft 116 extends through the core of the gas generator 102, the power turbine 128 is not coupled to the core of the gas generator 102 by a shaft, and the rotational axis of the power turbine 128 is substantially perpendicular to the rotational axis of the core of the gas generator 102 (i.e., the axes P1 and P2). Compressor 120, combustor 122 and turbines 124/128 also have at a much smaller diameter than propulsion fans 110, and can be configured for mounting in a relatively small tail section 114. Thus, the dual-core, two-propulsor configuration of gas gas generators 102, power turbines 128 and propulsion fan assemblies 110 provides a light, efficient, and low-drag propulsion engine for use on aircraft 100. Applications include unmanned aerial vehicles (UAVs), unmanned drones, military transports and, because two gas turbine engines are provided, commercial aircraft.

Propeller engines are typically larger in diameter than turbofans and geared turbofan (GTF) engines, and counter-rotating (CR) engines are smaller in diameter than single-rotation configurations. That is, counter-rotating engines run to higher disk power loading, for the same thrust. Twin-propulsion engines are also smaller in diameter than a single-rotor configuration, with equivalent total thrust. As a result, twin counter-rotating propulsion fans are significantly smaller in diameter than single single-rotation pusher engines, providing greater design flexibility for overall aircraft configuration.

In addition, core flow W is decoupled from the flow through propulsion fans 110. This allows inlet 125 and outlet 132 to be sized and configured for the relatively lower core flow volume, as opposed to the higher inlet flow of a standard turbofan design. The positioning of gas generators 102 and power turbines 128 within the fuselage 106 also avoids issues related to both tractor-type (forward mount) engine configurations, where the core inlet flow passes through the propeller or fan blades, and pusher-type (aft mount) configurations, where interference between the exhaust flow and fan or propeller rotation is an issue.

Fan assemblies mounted to struts require the fans 111 to cut through the pressure distortion wake created aft of the strut, causing vibration and noise. Positioning the exhaust duct 132 to expel the exhaust gas at the trailing edge 134 of the strut 136 allows the exhaust flow to smooth out the wake of the strut 136, thereby reducing vibration and noise. Also, some ingestion of the fuselage 106 boundary layer flow at the inlets 125 will serve to create a thinner boundary layer approaching the props 111A and 111B, allowing them to be positioned closer to the fuselage 106, thereby requiring a shorter strut 136.

Figure 4:
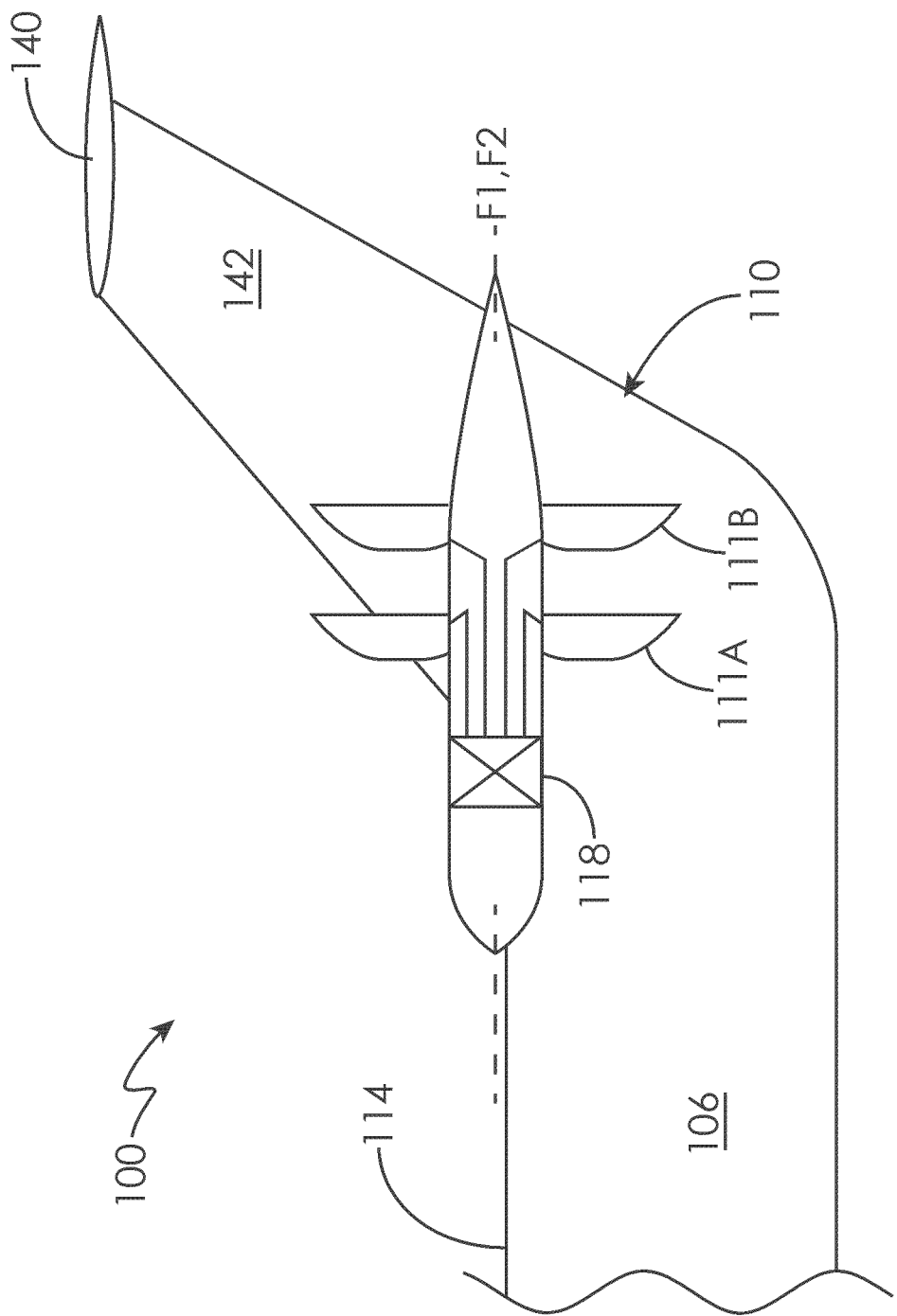
FIG. 4 is a schematic elevational view of an aircraft tail section with counter-rotating pusher props installed on the aft aircraft fuselage in an embodiment.

FIG. 4 is a side view of aircraft 100, showing the T-tail configuration of fuselage 106 in tail section 114. In this configuration, horizontal stabilizer (or tailplane) 140 is mounted to the top portion of vertical stabilizer 142, above twin fan assemblies 110. This places horizontal stabilizer 140 well out of the fan wake, and well out of the downstream airflow from the wing, for improved airflow and control.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A propulsion assembly for use in an aircraft, the assembly comprising:
    gas generator comprising a compressor, a combustor and a turbine mounted along a power core axis, the gas generator being located Within a fuselage of the aircraft;
    a power turbine aft of the gas generator and aerodynamically coupled to the gas generator, the power turbine being located radially outside of a housing of the gas generator and outward from the power core axis, the power turbine being mounted about a power turbine axis that is substantially perpendicular to the power core axis, the power turbine being located within the fuselage;
    a shaft operably coupled to the power turbine and extending along a shaft axis transverse to the power core axis;
    a propulsion fan operatively coupled to the shaft, wherein the propulsion fan is secured to the fuselage by a strut; and
    an exhaust duct extending from the power turbine to an exhaust outlet located at the strut.

2. The assembly of claim 1, further comprising a transition duct aerodynamically coupling the gas generator to the power turbine, the transition duct operative to turn core gas flow from the gas generator flowing parallel to the power core axis to flow parallel to the power turbine axis.

3. The assembly of claim 1, further comprising a right angle gear coupling the propulsion fan to the shaft.

4. The assembly of claim 1, wherein the propulsion fan rotates about a fan axis substantially perpendicular to the power turbine axis.

5. The assembly of claim 1, wherein the propulsion fan comprises an open rotor.

6. The assembly of claim 1, wherein the propulsion fan comprises two counter-rotating fan stages.

7. The assembly as in claim 1, further comprising: a gearbox operably coupling the propulsion fan to the shaft; wherein the propulsion fan rotates about a fan axis transverse to the shaft axis.

8. The assembly of claim 7, further comprising: a second power turbine aerodynamically coupled to a second gas generator, the second power turbine mounted about a second power turbine axis that is substantially perpendicular to the power core axis.

9. The assembly of claim 8, further comprising a transition duct aerodynamically coupling the gas generator to the power turbine, the transition duct operative to turn core gas flow from the gas generator flowing parallel to the power core axis to flow parallel to the power turbine axis.

10. The assembly of claim 7, wherein the gearbox comprises a right angle gear mechanism coupling the propulsion fan to the shaft.

11. The assembly of claim 7, wherein the fan axis is substantially perpendicular to the shaft axis.

12. The assembly of claim 7, wherein the propulsion fan comprises an unducted fan rotor.

13. The assembly of claim 7, wherein the propulsion fan comprises two counter-rotating fan stages.

14. An aircraft, comprising:
 a fuselage having a nose section and a tail section separated along a fuselage longitudinal axis; and
 a propulsion assembly comprising:
  a gas generator comprising a compressor, a combustor and a turbine mounted along a power core axis, the gas generator being located within the fuselage of the aircraft;
  a power turbine aft of the gas generator and aerodynamically coupled to the gas generator, the power turbine being located radially outside of a housing of the gas generator and outward from the power core axis the power turbine being mounted about a power turbine axis that is substantially perpendicular to the power core axis, the power turbine being located within the fuselage;
  a shaft operably coupled to the power turbine and extending along a shaft axis transverse to the power core axis;
  a propulsion fan operatively coupled to the shaft, wherein the propulsion fan is secured to the fuselage by a strut; and
  an exhaust duct extending from the power turbine to an exhaust outlet located at the strut.

15. The aircraft of claim 14, further comprising a wing mounted to the fuselage between the nose section and the tail section.

16. The aircraft of claim 14, wherein propulsion fan rotates about a fan axis that is transverse with respect to the power turbine axis and longitudinal with respect to the fuselage longitudinal axis.

17. The aircraft of claim 14, wherein the gas generator is mounted in the tail section of the fuselage.

18. The aircraft of claim 14, wherein the propulsion fan rotates about a fan axis that is substantially perpendicular to the power turbine axis and substantially parallel to the fuselage longitudinal axis.

19. The aircraft of claim 14, wherein the propulsion fan comprises two open-rotor, counter-rotating fan stages.

\* \* \* \* \*